United States Patent
Cheng et al.

(10) Patent No.: US 8,090,569 B2
(45) Date of Patent: Jan. 3, 2012

(54) APPARATUS AND METHOD FOR TESTING ELECTRONIC APPARATUSES

(75) Inventors: Hua-Dong Cheng, Shenzhen (CN); Feng Zhou, Shenzhen (CN); Bin-Gang Duan, Shenzhen (CN); Zhi-Xin Xu, Shenzhen (CN); Ruey-Shyang You, Taipei Hsien (TW); Han-Che Wang, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 610 days.

(21) Appl. No.: 12/350,237

(22) Filed: Jan. 8, 2009

(65) Prior Publication Data
US 2010/0125445 A1  May 20, 2010

(30) Foreign Application Priority Data
Nov. 14, 2008  (CN) .............................. 200810305559

(51) Int. Cl.
*G06F 9/455*  (2006.01)
(52) U.S. Cl. .......................................................... 703/23
(58) Field of Classification Search .................... 703/23
See application file for complete search history.

(56) References Cited

U.S. PATENT DOCUMENTS

| | | | | |
|---|---|---|---|---|
| 5,640,537 | A * | 6/1997 | Jessen et al. | 703/23 |
| 5,854,930 | A * | 12/1998 | McLain et al. | 717/139 |
| 5,969,835 | A * | 10/1999 | Kamieniecki et al. | 398/33 |
| 7,127,649 | B2 * | 10/2006 | Leaming | 714/715 |
| 7,743,292 | B2 * | 6/2010 | Jing et al. | 714/719 |
| 2002/0133635 | A1 * | 9/2002 | Schechter et al. | 709/310 |
| 2005/0289260 | A1 * | 12/2005 | Hamer et al. | 710/74 |
| 2006/0136579 | A1 * | 6/2006 | Linville et al. | 709/223 |

FOREIGN PATENT DOCUMENTS

| | | |
|---|---|---|
| CN | 1760690 A | 4/2006 |
| CN | 101175284 A | 5/2008 |

* cited by examiner

*Primary Examiner* — Dwin M Craig
(74) *Attorney, Agent, or Firm* — Altis Law Group, Inc.

(57) ABSTRACT

A method for testing electronic apparatuses is provided. The method includes: reading an identification (ID) of an emulator adapter; searching for the script name in a test table according to the ID; fetching the script from a storage according to the determined script name and running the fetched script to pass each of input commands; and receiving and identifying each of the input commands to simulate a key input via an electrical conductive path, correspondingly to the input command, of the emulator adapter, such that an input key corresponding to the key input of the to-be-tested electronic apparatus is activated and the to-be-tested electronic apparatus performs a function associated with the input key correspondingly. A related test apparatus is also provided.

9 Claims, 3 Drawing Sheets

APPARATUS AND METHOD FOR TESTING ELECTRONIC APPARATUSES

TECHNICAL FIELD

The disclosure relates to a testing apparatus and a method for testing electronic apparatuses.

DESCRIPTION OF RELATED ART

After manufacturing, various functions of electronic apparatuses need to be tested. For example, messaging function, call register function of a mobile phone need to be tested. A conventional testing method is that a computer runs a script to pass each of input commands of the script to a to-be-tested electronic apparatus, and the to-be-tested electronic apparatus receives and indentifies each of the input commands to conduct an input key of the keyboard, correspondingly to the input command, of the to-be-tested electronic apparatus. The to-be-tested electronic apparatus then performs a function associated with the input key correspondingly. However, using this method, each of the to-be-tested electronic apparatuses need to be installed a test procedure which is used for the to-be-tested electronic apparatus to indentify each of the input commands of the script. After completing the test on the to-be-tested electronic apparatus, the test procedure needs to be uninstalled. It is time consuming to uninstall the procedure.

Therefore, what is needed is a testing apparatus and a method which can efficiently test different functions of to-be-tested electronic apparatuses.

BRIEF DESCRIPTION OF THE DRAWINGS

The components of the drawings are not necessarily drawn to scale, the emphasis instead being placed upon clearly illustrating the principles of a testing apparatus and a method for testing electronic apparatuses. Moreover, in the drawings, like reference numerals designate corresponding parts throughout several views.

DETAILED DESCRIPTION OF THE EMBODIMENTS

Figure 1:
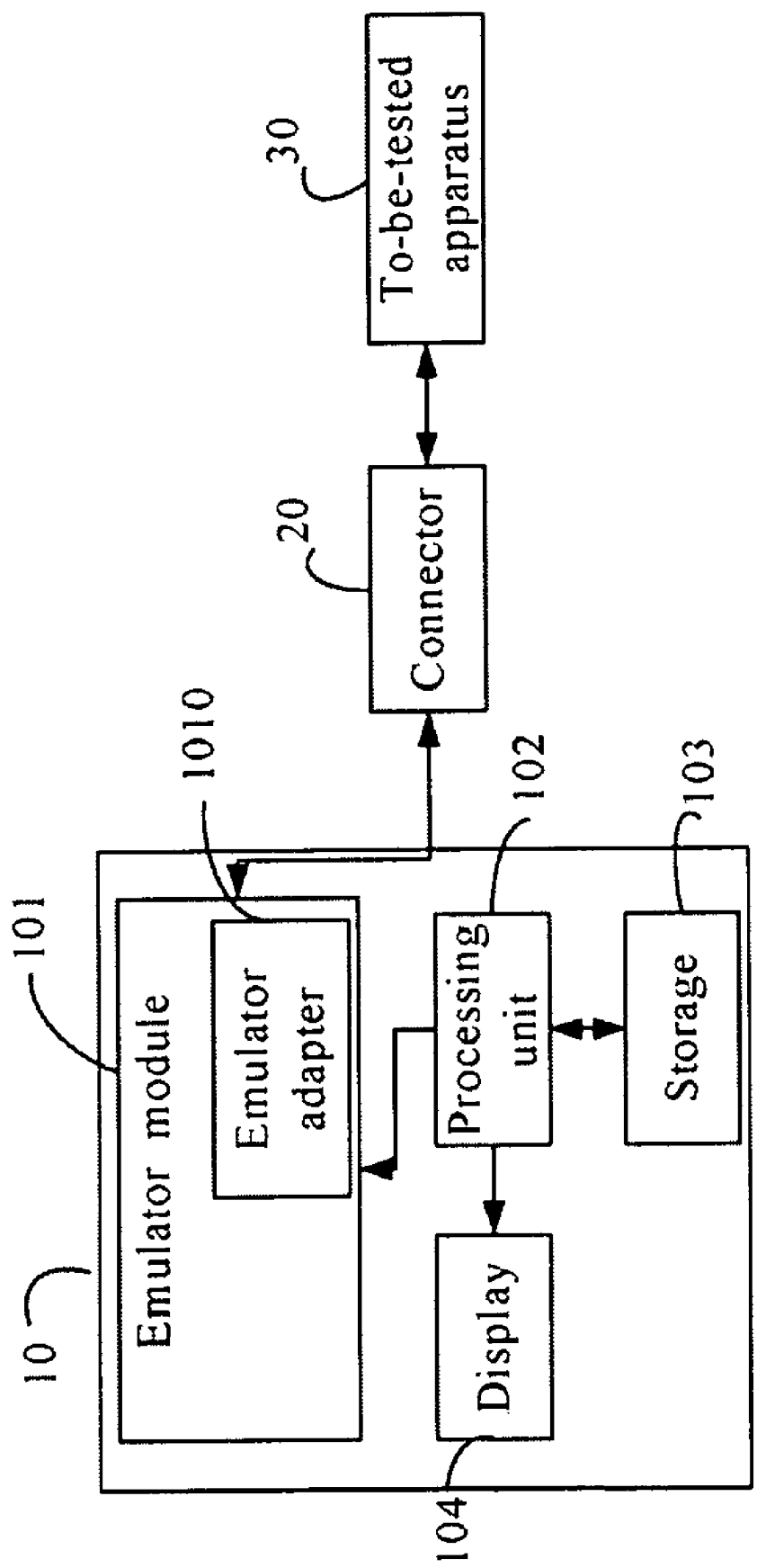
FIG. 1 is a hardware infrastructure block diagram of a testing apparatus in accordance with an exemplary embodiment.

FIG. 1 is a hardware infrastructure block diagram of a testing apparatus 10 in accordance with an exemplary embodiment.

The testing apparatus 10 includes an emulator module 101 and a processing unit 102. The emulator module 101 includes a slot (not shown). The slot can receive different types of emulator adapters 1010. Each type of the emulator adapters 1010 corresponds to a type of to-be-tested apparatus 30 (e.g., a digital photo frame or a mobile phone), and is connectable to the type of to-be-tested apparatus 30 via a connector 20 correspondingly. The connector 20 can be changed according to the type of the to-be-tested apparatuses 30. Each emulator adapter 1010 has an identification (ID) and includes a plurality of electrical conductive paths. In an exemplary embodiment, each of the electrical conductive paths includes a transistor and a thyristor, and simulates a key input on the keyboard of the to-be-tested apparatus 30. That is, when an electrical conductive path is conducted, it correspondingly simulates an actuation of a key input using the keyboard of the to-be-tested apparatus 30 and as a result the to-be-tested apparatus 30 performs a function according to the key input correspondingly.

The testing apparatus 10 further includes a storage 103 and a display 104. The storage 103 is configured for storing a test table as exampled below and a plurality of scripts. Each of the script is assigned a script name for identification, and is configured for testing a type of the to-be-tested apparatuses 30. The test table includes an ID column and a script name column, and is configured for recording relationships between the IDs of the emulator adapters 1010 and the script names of the script. Each of the script is further consisted of a plurality of input commands. Each of the input commands includes, but is not limited to, an input key code of an input key of the keyboard of the to-be-tested apparatus 30, and a time duration of keeping the input key actuated.

| Test table | |
|---|---|
| ID | Script name |
| ID1 | A1 |
| ID2 | A2 |
| ID3 | A3 |
| ... | ... |

Figure 2:
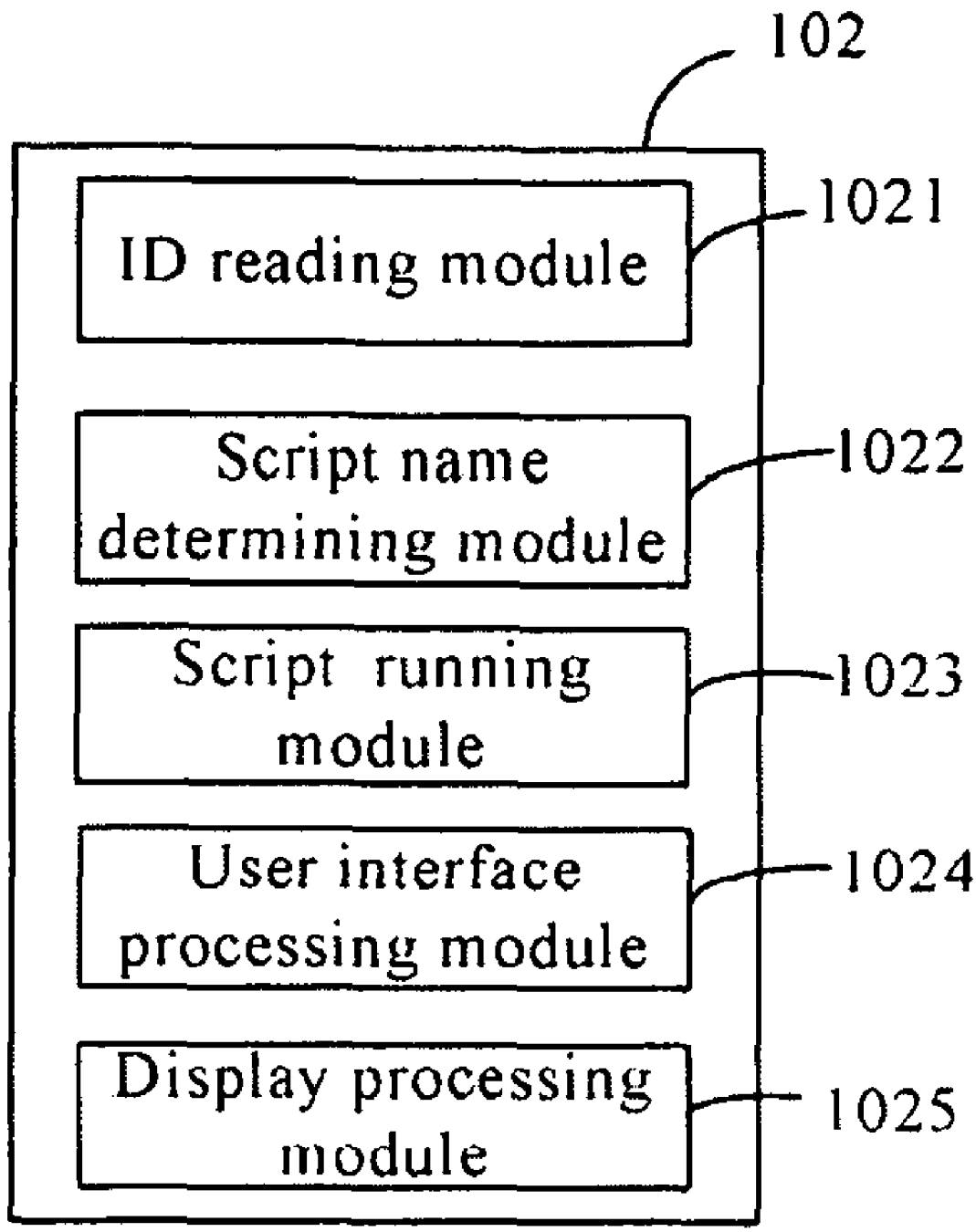
FIG. 2 is a block diagram of main function modules implemented by a processing unit of the test apparatus of FIG. 1 in accordance with an exemplary embodiment.

FIG. 2 is a block diagram of main function modules implemented by the processing unit 102 of the test apparatus 10 in accordance with an exemplary embodiment.

The processing unit 102 includes an ID reading module 1021, a script name determining module 1022, and a script running module 1023.

The ID reading module 1021 is configured for reading the ID of the emulator adapter 1010 coupled to the slot of the emulator module 101. The script name determining module 1022 is configured for searching for the script name in the test table according to the ID of the emulator adapter 1010. The script running module 1023 is configured for fetching the script from the storage 103 according to the determined script name and invoking the script. The script running module 1023 passes each of the input commands of the script to the emulator module 101. The emulator module 101 receives and identifies each of the input commands and transfers a signal (e.g., a high voltage) to conduct a simulated key input via an electrical conductive path, correspondingly to the input command, of the emulator adapter 1010. Accordingly, the input key corresponding to the key input of the keyboard of the to-be-test apparatus 30 is activated and the to-be-test apparatus 30 performs a function associated with the input key correspondingly.

The processing unit 102 further includes a user interface processing module 1024 and a display processing module 1025.

The user interface processing module 1024 is configured for providing a user interface. The user interface includes a text display region and a user operation region. The text display region is configured for displaying a history of the input commands run by the script running module 1023. The user operation region is configured for providing a plurality of optional operations in relation to the script, for example, pausing the script, continuing the script, and stopping the script. The display processing module 1025 is configured for displaying the user interface on the display 104, and displaying the history of the input commands run by the script running module 1023 in the text display region of the user interface.

Figure 3:
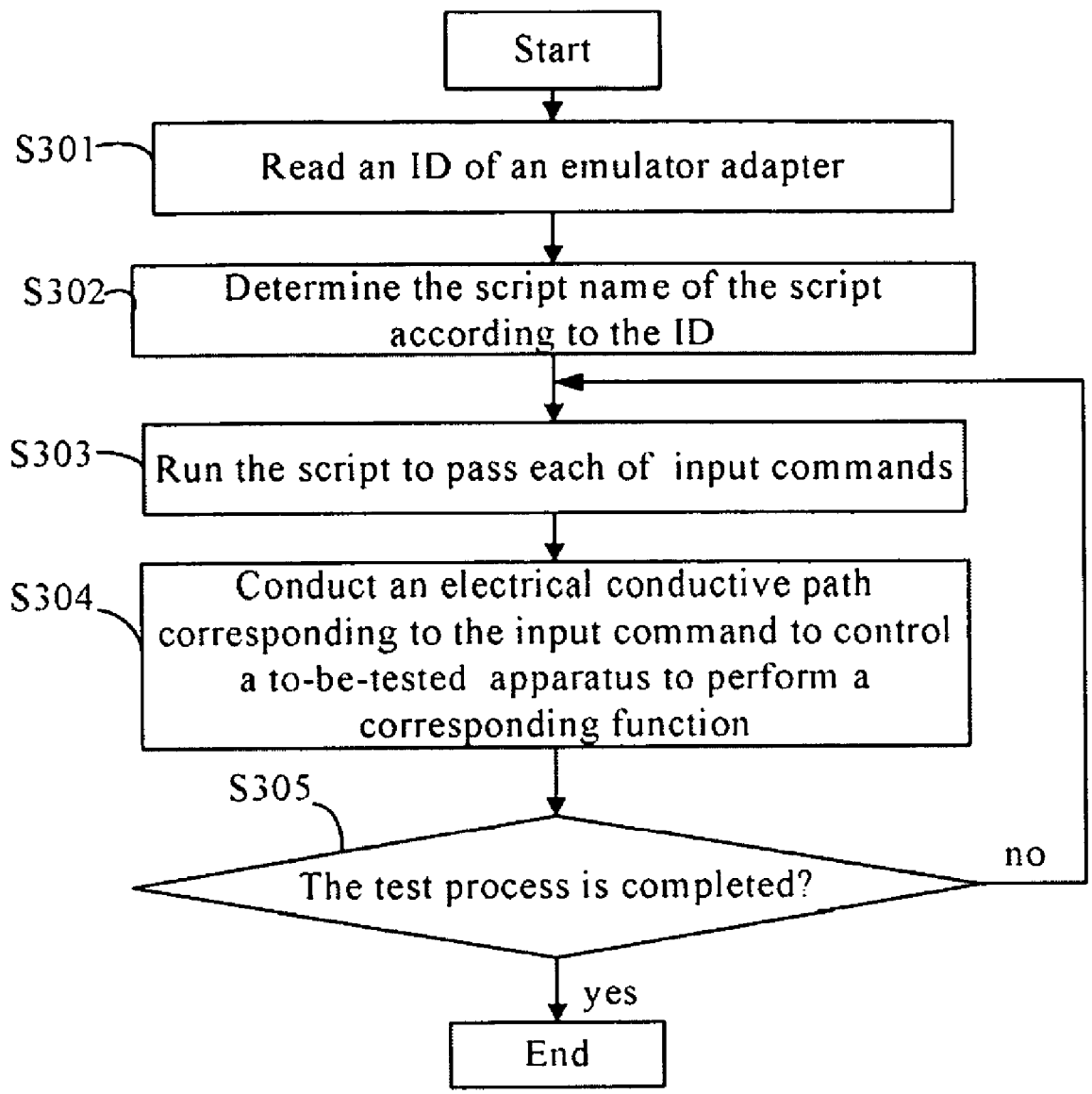
FIG. 3 is a flowchart of a method for testing an electronic apparatus utilizing the testing apparatus of FIG. 1 in accordance with an exemplary embodiment.

FIG. 3 is a flow chart of a method for testing the to-be-tested apparatuses 30 utilizing the testing apparatus 10 in accordance with an exemplary embodiment.

In step S301, the ID reading module 1021 reads the ID of the emulator adapter 1010 coupled to the slot of the emulator module 101.

In step S302, the script name determining module 1022 searches for the script name in the test table according to the ID of the emulator adapter 1010.

In step S303, the script running module 1023 fetches the script from the storage 103 according to the determined script name and runs the fetched script to pass each of the input commands to the emulator module 101.

In step S304, the emulator module 101 receives and identifies an input command and transfers a signal (e.g. a high voltage) to conduct a simulated key input via an electrical conductive path, correspondingly to the input command, of the emulator adapter 1010. Accordingly, the input key corresponding to the key input of the keyboard of the to-be-tested apparatus 30 is activated and the to-be-tested apparatus 30 performs a function associated with the input key correspondingly.

In step S305, the script running module 1023 determines whether the test process on the to-be-tested apparatus 30 is completed. If the test process is completed, the procedure ends, otherwise the procedure goes to step S303 described above.

Although the present disclosure has been specifically described on the basis of preferred embodiments and method thereof, the disclosure is not to be construed as being limited thereto. Various changes or modifications may be made to the embodiments without departing from the scope and spirit of the invention.

What is claimed is:

1. A testing apparatus capable of testing an electronic apparatus comprising:
   at least one of emulator adapter, each of which has an identification (ID) and a plurality of electrical conductive paths;
   an emulator module with a slot configured for receiving one of the at least one emulator adapter, wherein each type of the emulator adapter corresponds to a type of electronic apparatuses, and each electrical conductive path of the emulator adapter coupled to the slot of the emulator module is capable of simulating a key input key of the electronic apparatus correspondingly;
   a storage configured for storing a test table and at least one script, wherein each of the at least one script is assigned a script name for identification, and is configured for testing functions of type of the electronic apparatus, and is further consisted of a plurality of input commands, the test table is configured for recording relationships between the ID of each of the at least one emulator adapter and the corresponding script name of one of the at least one script; and
   a processing unit comprising:
      an ID reading module configured for reading the ID of the emulator adapter coupled to the slot of the emulator module;
      a script name determining module configured for searching for the corresponding script name in the test table according to the ID of the emulator adapter; and
      a script running module configured for fetching the corresponding script from the storage according to the determined script name, and running the fetched script to pass each of the input commands to the emulator module;
   wherein the emulator module is further configured for receiving and identifying each of the input commands to conduct a simulated key input via an electrical conductive path, correspondingly to the input command, of the emulator adapter, such that the input key corresponding to the key input of the electronic apparatus is activated and the electronic apparatus performs a function associated with the input key correspondingly.

2. The testing apparatus as described in claim 1, wherein each of the electrical conductive paths of the emulator adapter coupled to the slot of the emulator module is connected to an input key of the electronic apparatus via a connector.

3. The testing apparatus as described in claim 1, wherein each of the input commands comprises an input key code of an input key and a time duration of keeping the input key actuated.

4. The testing apparatus as described in claim 1, wherein the processing unit further comprises a user interface processing module configured for providing a user interface.

5. The testing apparatus as described in claim 4, wherein the user interface comprises a text display region and a user operation region, wherein the text display region is configured for displaying a history of input commands run by the script running module, the user operation region is configured for providing a plurality of optional operations in relation to the script, the optional operations comprise pausing the script, continuing the script, and stopping the script.

6. The testing apparatus as described in claim 5 further comprising a display, wherein the processing unit further comprises a display processing module configured for displaying the user interface on the display, and displaying the history of input commands run by the script running module in the text display region of the user interface.

7. The testing apparatus as described in claim 1, wherein each of the at least one electrical conductive path comprises a transistor and a thyristor.

8. An electronic apparatus testing method comprising:
   providing a storage configured for storing a test table and a plurality of scripts, wherein each of the scripts is assigned a script name for identification, and is configured for testing functions of a type of electronic apparatus, and further consisted of a plurality of input commands, the test table is configured for recording relationships between the IDs of emulator adapters connected to the testing apparatus and the script names;
   reading an ID of an emulator adapter coupled to the testing apparatus;
   searching for the script name in the test table according to the ID of the emulator adapter;
   fetching the script from the storage according to the determined script name and running the fetched script to pass each of the input commands of the script; and
   receiving and identifying each of the input commands to simulate a key input via an electrical conductive path, correspondingly to the input command, of the emulator adapter, such that an input key corresponding to the key input of the to-be-tested electronic apparatus is activated and the electronic apparatus performs a function associated with the input key accordingly.

9. The method as described in claim 8, wherein each of the input commands comprises an input key code of an input key and a time duration of keeping the input key actuated.

* * * * *